(12) United States Patent
Liu (10) Patent No.: US 9,191,163 B2
(45) Date of Patent: Nov. 17, 2015

(54) SYSTEMS AND METHODS FOR HYBRID CONTENT DELIVERY

(75) Inventor: Hui Liu, Clyde Hill, WA (US)

(73) Assignee: CMMB Vision USA Inc., Central Hong Kong (HK)

( * ) Notice: Subject to any disclaimer, the term of this patent is extended or adjusted under 35 U.S.C. 154(b) by 0 days.

(21) Appl. No.: 13/411,057

(22) Filed: Mar. 2, 2012

(65) Prior Publication Data
US 2013/0229979 A1  Sep. 5, 2013

(51) Int. Cl.
*H04B 7/00* (2006.01)
*H04L 1/18* (2006.01)
*H04L 1/00* (2006.01)

(52) U.S. Cl.
CPC ....... *H04L 1/1893* (2013.01); *H04L 2001/0093* (2013.01); *H04L 2001/0097* (2013.01)

(58) Field of Classification Search
CPC ..... H04W 80/04; H04W 88/06; H04W 88/08; H04W 84/18; H04L 29/06
USPC ................................. 210/903, 906; 370/353
See application file for complete search history.

(56) References Cited

U.S. PATENT DOCUMENTS

| | | | | |
|---|---|---|---|---|
| 5,896,402 | A * | 4/1999 | Kurobe et al. | 714/748 |
| 6,622,007 | B2 * | 9/2003 | Linden | 455/12.1 |
| 7,161,934 | B2 * | 1/2007 | Buchsbaum et al. | 370/382 |
| 7,412,642 | B2 * | 8/2008 | Cypher | 714/776 |
| 7,894,678 | B2 * | 2/2011 | Nakata et al. | 382/232 |
| 8,179,788 | B2 * | 5/2012 | Chun et al. | 370/224 |
| 8,199,696 | B2 * | 6/2012 | Sarkar et al. | 370/328 |
| 8,225,161 | B2 * | 7/2012 | Chernyshev et al. | 714/748 |
| 8,488,590 | B2 * | 7/2013 | Yanai et al. | 370/352 |
| 8,488,598 | B2 * | 7/2013 | Silver et al. | 370/353 |
| 8,634,400 | B2 * | 1/2014 | Kim et al. | 370/349 |

(Continued)

OTHER PUBLICATIONS

Kuang and Williamson, A Bidirectional Multi-channel MAC Protocol for Improving TCP Performance on Multihop Wireless Ad Hoc Networks.*

(Continued)

*Primary Examiner* — Melvin Marcelo
*Assistant Examiner* — Peter Solinsky
(74) *Attorney, Agent, or Firm* — Maier & Maier, PLLC (57) ABSTRACT

Systems and methods which provide data communication content delivery through a hybrid network implementation are disclosed. A hybrid network configuration may utilize a broadcast communication technique to deliver large amounts of data communication content to one or more mobile communication device via uni-directional network links and a uni-cast communication technique via bi-directional network links with the one or more mobile communication device to facilitate delivery and utilization of the data communication content. Data content delivery loss recovery techniques implemented according to embodiments of the invention utilize network links of the hybrid network other than or in addition to the uni-directional network links to implement loss recovery techniques such as a hybrid repeat technique, a hybrid retransmission technique, hybrid statistical feedback technique, and/or combinations thereof.

16 Claims, 6 Drawing Sheets

(56) References Cited

U.S. PATENT DOCUMENTS

| | | | |
|---|---|---|---|
| 2002/0114283 A1* | 8/2002 | Lee | 370/252 |
| 2002/0129134 A1* | 9/2002 | Leighton et al. | 709/223 |
| 2003/0130000 A1* | 7/2003 | Le et al. | 455/502 |
| 2004/0179515 A1* | 9/2004 | Kamani et al. | 370/352 |
| 2005/0152397 A1* | 7/2005 | Bai et al. | 370/468 |
| 2005/0193127 A1* | 9/2005 | Moore et al. | 709/228 |
| 2008/0019307 A1 | 1/2008 | Tenny et al. | |
| 2008/0148123 A1* | 6/2008 | Pendakur et al. | 714/748 |
| 2009/0135717 A1* | 5/2009 | Kamal et al. | 370/225 |
| 2009/0238153 A1* | 9/2009 | Sim | 370/336 |
| 2010/0272102 A1* | 10/2010 | Kobayashi | 370/389 |
| 2011/0045910 A1 | 2/2011 | McKenna et al. | |
| 2011/0141968 A1* | 6/2011 | Trainin | 370/328 |
| 2011/0274142 A1* | 11/2011 | Miki et al. | 375/141 |
| 2012/0033620 A1* | 2/2012 | Thoen et al. | 370/329 |
| 2012/0044811 A1* | 2/2012 | White et al. | 370/238 |
| 2012/0047142 A1* | 2/2012 | Conway | 707/737 |
| 2013/0067030 A1* | 3/2013 | Turner et al. | 709/217 |
| 2013/0246876 A1* | 9/2013 | Manssour et al. | 714/751 |

OTHER PUBLICATIONS

Kuang, Tianbo and Williamson, Carey, A Bidirectional Multi-channel MAC Protocol for Improving TCP Performance on Multihop Wireless Ad Hoc Networks, MSWiM'04, Oct. 4-6, 2004, Venezia, Italy Copyright 2004 ACM 1-58113-953-05/04/0010 . . . $5.00.*

Ostovari, Pouya; Wu, Jie; and Khreishah, Abdallah; Network Coding Techniques for Wireless and Sensor Networks.*

Sprintson, Alex, Network Coding and its Applications in Communication Networks.*

IETF RFC5740, NACK-Oriented Reliable Multicast (NORM) Transport Protocol, Nov. 2009.*

Music Choice fact sheet.*

International Search Report and Written Opinion issued for PCT/US2013/028652, dated Jun. 25, 2013, 10 pages.

* cited by examiner

SYSTEMS AND METHODS FOR HYBRID CONTENT DELIVERY

CROSS-REFERENCE TO RELATED APPLICATIONS

The present application is related to co-pending and commonly assigned U.S. patent application Ser. No. 13/362,957 entitled "Systems and Methods for Broadcast-Enhanced Data Services," filed Jan. 31, 2012, the disclosure of which is incorporated herein by reference.

TECHNICAL FIELD

This invention relates to data communications and more particularly to techniques for hybrid delivery of data communication content.

BACKGROUND OF THE INVENTION

The use of data communication for delivery of various content, including digital data, documents, media (e.g., images, sound, etc.), multimedia, (e.g., images and sound), etc., has become nearly ubiquitous in recent years. One common architecture for providing such data communication includes a first data communication device and a second data communication device which are configured to communicate with each other over a network providing one or more data communication channel. Such data communication channels can be hard-wired or wireless. Examples of hard-wired data communication channels include broadband cable and digital subscriber line (DSL). Examples of wireless communications channels include Edge, 3G, 4G, WiMAX and Wi-Fi.

In one example of the use of data communication, a mobile communication device, such as a smart phone, a personal digital assistant (PDA), a tablet device, a portable personal computer (PC), can communicate with a centralized system, such as a web server, application server, database server, etc., providing data to and/or accepting from the mobile communication device via a network. The network may include a combination of communication channels utilized in providing data communication between the mobile communication device and the centralized system. For example, the mobile communication device may communicate with a broadband cellular station of the network using an Edge, 3G or 4G communication channel. The cellular station may then pass the communication along to a network router over a fiber-optic or T-carrier line. The network router may then pass the communication along to the centralized system over a broadband cable or DSL connection. That is, one or more different communication channels of the network may be utilized to provide the network link between the mobile communication device and the centralized system.

A number of communication techniques, including various data-cast techniques and recipient signaling techniques, may be utilized in providing such data communications. For example, data communication may be provided using a uni-cast data-cast technique, whereby the data is transmitted as a uni-cast data stream by a first communication device (e.g., the aforementioned centralized system) to a particular second communication device (e.g., the aforementioned mobile communication device). Alternatively, data communication may be provided using a multi-cast data-cast technique, whereby the data is transmitted as a multi-cast data stream by a first communication device (e.g., the aforementioned centralized system) to a plurality of selected communication devices (e.g., specifically identified first and second mobile communication devices). Data communication may likewise be provided using a broadcast data-cast technique, whereby the data is transmitted as a broadcast data stream by a first communication device (e.g., the aforementioned centralized system) to a plurality of receiving communication devices (e.g., first and second mobile communication devices desirous of receiving the data, although not specifically identified for providing data to by the centralized system).

The foregoing data streams may be transmitted using various recipient signaling techniques. For example, feedback techniques may be utilized between a receiving communication device and a transmitting communication device to provide acknowledgment of receipt of individual data packets and/or request for retransmission of particular data packets which were not received or which otherwise contained data which is unsatisfactory to or unusable by the receiving data communication device. Such feedback techniques may utilize appreciable network resources (e.g., communication bandwidth, processing cycles, etc.) and introduce data latency, and thus are often impractical where a large number of receiving communication devices are involved (e.g., primarily useful with respect to uni-cast communications or multi-cast communications with a relatively small number of receiving communication devices). Alternatively, feedback between a receiving communication device and a transmitting communication device may not be used in favor of blind transmission of data, thereby avoiding utilizing network resources for acknowledgments, requests for retransmission, and retransmission of data (e.g., particularly useful with respect to broadcast communications or multi-cast communications with a relatively large number of receiving communication devices). However, such blind transmission techniques can result in missing data or data which is unusable by the receiving communication device, without providing any way for the receiving communication device to obtain the missing or unusable data. Accordingly, systems utilizing blind transmission are often configured to accommodate a worst case, or expected worst case, situation. For example, a transmitting communication device may implement transmission data redundancy at a level sufficient to meet an expected worst case. Such a configuration may, however, result in unnecessary utilization of network resources, such as where the worst case situation is not experienced.

It should be appreciated that, although there may several different types of communication channels in a network, typical systems operate to utilize a single network link (perhaps comprised a multiple communication channels) for a data communication session between a first and second communication device regardless of which of the foregoing communication techniques may be utilized. Moreover, the network links provided with respect to a number of data communication device pairings (e.g., the network link between the first communication device and second communication device and the network link between the first communication device and third communication device) may utilize a number common network devices. These common network devices may be used by several users at once and, therefore, demands on the common network device's bandwidth may be great. For example, in an urban environment, hundreds of mobile communication device users may simultaneously access a single cellular data node. Since the cellular data node has limited capacity to carry data, there may be restrictions on the bandwidth available to each user. This problem is particularly aggravated when the mobile device users attempt to access large data files, such as media files. Thus, these common network devices often become data bottlenecks and ultimately restrict the usability of the system, particularly with respect to certain types of data communication.

Recently, this bottleneck problem has been exacerbated by an increased popularity of streaming media content, such as Internet-based TV, movies, and music. This streaming media content is most often transmitted "over the top" of the standard communication channels, meaning that the regular bandwidth of the communication channel may be heavily consumed by a small number of users, leaving the remaining users to contend for the leftover bandwidth. In order to combat this problem, some Internet service providers have started restricting bandwidth usage and/or charging additional fees for high consumption. By way of example, a mobile communication device may be restricted to a 2 to 4 gigabyte limit on downloads within a specified period, such as a month. Other methods include pay-as-you-go, meaning that the user simply pays for bandwidth on a per-unit basis. For example, a user may be charged a few cents per megabyte of downloaded content.

As it turns out, much of the heavy network traffic is not unique to a particular user or communication device in many situations. Often users tend to consume similar types of content files. For example, each mobile device may require the same operating system upgrades periodically released by an operating system developer. In another example, certain video content tends to "go viral," meaning that the content becomes very popular among a large number of users within a short period of time. In other cases, such as with regular television programming, regular groups of users may be interested in viewing the content within a given time period.

One solution proposed for the delivery of such widely consumed data communication content is to implement a datacast network for large file downloads as described in U.S. Pat. No. 6,622,007 to Linden. Linden describes a system where media files are broadcast to a remote device over a wireless broadcast network using blind transmission techniques. The broadcast includes an ancillary data channel (e.g., non-real-time media file download) broadcast in the same broadcast channel (i.e., the same communication link) as a primary data channel (e.g., real-time program). The remote device then extracts and stores the data of the ancillary data channel for subsequent output to a user. The datacast system disclosed by Linden includes several disadvantages. For example, the system only operates asynchronously, meaning that the media file downloaded from the data cast network cannot be used in real time. Moreover, the datacast system of Linden relies only upon blind transmission broadcast techniques to deliver both the primary data channel and ancillary data channel.

BRIEF SUMMARY OF THE INVENTION

The present invention is directed to systems and methods which provide data communication content delivery through a hybrid network implementation. A hybrid network configuration utilized for data communication content delivery according to embodiments of the invention provides a plurality of different network links, implementing different communication techniques, between the data communication devices of data communication device pairings (i.e., a plurality of network links between a first data communication device, such as a centralized system, and a second data communication device, such as a mobile communication device). For example, a first network link of a hybrid network configuration of embodiments provides a bi-directional data communication link between data communication devices of a data communication device pairing, such as may be utilized for data communication content delivery, control signaling, etc., while a second network link provides a uni-directional data communication link between the data communication devices, such as may be utilized for delivery of large amounts of data communication content. The foregoing first and second network links are preferably provided using different data communication channels (e.g., different wireless communication channels, different communication media, etc.).

A hybrid network configuration of embodiments may, for example, utilize a broadcast communication technique to deliver large amounts of data communication content (e.g., media files) to one or more mobile communication device via uni-directional network links and a uni-cast communication technique via bi-directional network links with the one or more mobile communication device to facilitate delivery and utilization of the data communication content. Such hybrid network configurations implemented according to embodiments of the invention operate to deliver relatively large amounts of data communication content to data communication devices, such as a large number of mobile communication devices, in an efficient manner (e.g., low communication overhead, reduced overall use of the spectrum, efficient use of transmit power, reduced content delivery delay, optimized data redundancy, etc.).

It should be appreciated that uni-directional network links utilized for the delivery of large amounts of data communication content in hybrid network configurations of embodiments provide for blind transmission of data communication content. That is, data communication content is transmitted to one or more receiving data communication devices without the capability of feedback through the uni-directional network link from the receiving data communication device. Data communication content (e.g., data packet) loss may be experienced by the receiving data communication device in association with the transmission of data communication content via the uni-directional network link. Accordingly, embodiments of the invention implement one or more techniques for recovering data communication content losses associated with transmission via the uni-directional network link. Data content delivery loss recovery techniques implemented according to embodiments of the invention utilize network links (e.g., bi-directional network link) of the hybrid network other than or in addition to the uni-directional network links.

Embodiments of a hybrid network configuration implement a hybrid repeat technique for data content delivery content loss recovery. For example, each data communication device receiving data communication content delivery via a uni-directional network link of a hybrid network implementation may provide an automatic repeat request (ARQ) via a bi-directional network link of the hybrid network for retransmission of lost or otherwise unusable data packets. The appropriate data packets may thus be retransmitted to the requesting data communication device, such as via the uni-directional network link using uni-cast communication techniques.

Likewise, embodiments of a hybrid network configuration implement a hybrid retransmission technique for data content loss recovery. For example, each data communication device receiving data communication content delivery via a uni-directional network link of a hybrid network implementation may provide data communication content loss information, such as lost packet identification, via a bi-directional network link of the hybrid network for retransmission of lost or otherwise unusable data packets. The appropriate data packets for each such data communication device may be collected for combined retransmission, such as using network coding techniques for retransmission via the uni-directional network link.

Moreover, embodiments of a hybrid network configuration implement a hybrid statistical feedback technique for data content delivery loss recovery. For example, data communication devices receiving data communication content delivery via a uni-directional network link of a hybrid network implementation may provide feedback, such as via a bi-directional network link, of statistical information (e.g., bit error rate, dropped packet count, etc.) regarding their receipt of data communication content. The statistical information may be utilized for optimizing redundancy of data communication content transmitted in the uni-directional network link.

Embodiments of a hybrid network configuration implement a combination of data content delivery loss recovery techniques, such as a combination of any or all of the aforementioned hybrid repeat, hybrid retransmission, and hybrid statistical feedback techniques. A particular one or more such data content delivery loss recovery technique may be selected to optimize network efficiency, to minimize data content delivery losses, to minimize data recovery delays, to meet service objectives (e.g., quality of service), etc.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1A:
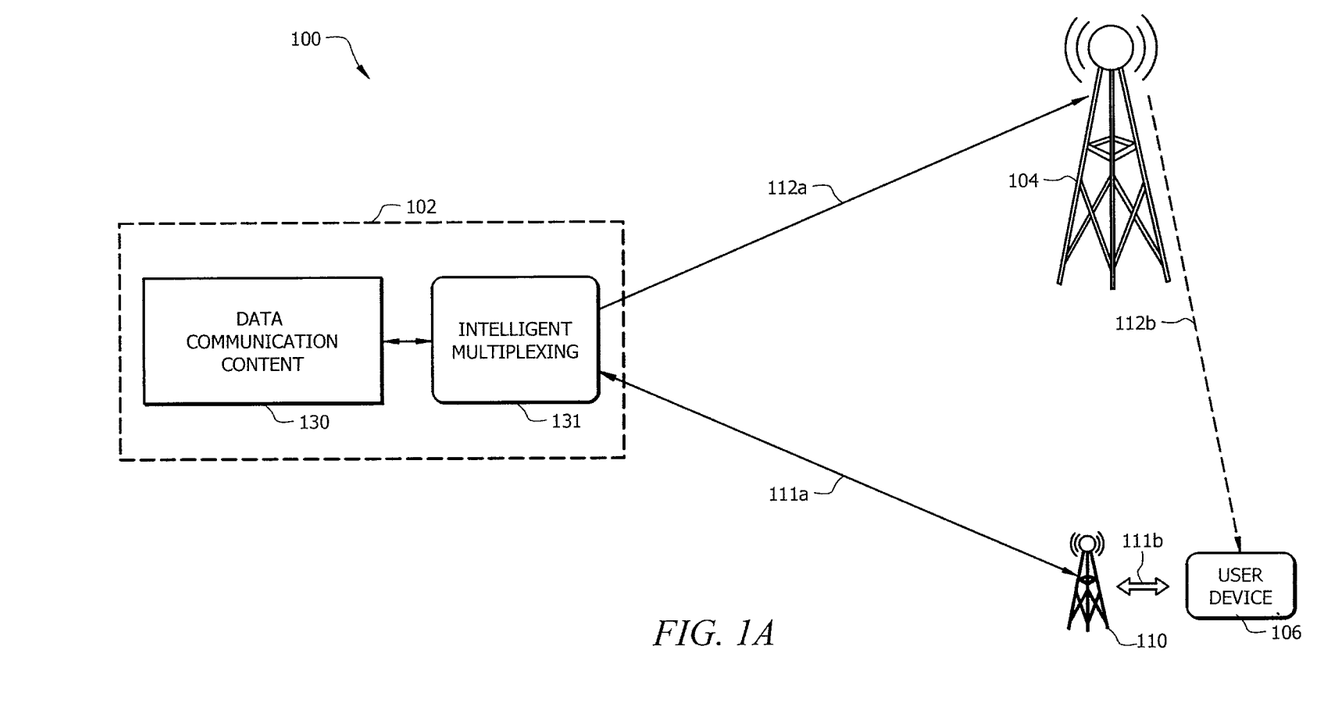
FIGS. 1A and 1B show a system adapted for hybrid delivery of data communication content according to embodiments of the invention.

FIG. 1A shows system 100 adapted for hybrid delivery of data communication content according to embodiments of the invention. The hybrid network configuration of system 100 of the illustrated embodiment provides a plurality of different network links (i.e., network link 111, comprising communication channels 111a and 111b, and network link 112, comprising communication channels 112a and 112b) between the data communication devices of a data communication device pair (i.e., centralized system 102 and user device 106). It should be appreciated that, although only a single data communication device pairing is shown, a plurality of data communication device pairs, each provided a plurality of different network links, may be provided by hybrid network configurations herein. For example, a plurality of user devices may be in communication with centralized system 102, wherein each such user device/centralized system pairing utilizes a plurality of network links similar to network links 111 and 112 of FIG. 1A.

It should be appreciated that, although particular embodiments of communication devices such as centralized system 102 and user device 106 are shown and described to facilitate an understanding of the concepts herein, any number of communication device configurations which are operable to function as described herein may be utilized according to embodiments of the invention. For example, centralized system 102 may comprise a plurality of systems (e.g., a server farm, an enterprise system, etc.) operable to provide data communication content transmission as described herein. Moreover, although described as a centralized system, a host supplying data communication content transmitted using hybrid network techniques herein need not be a server or other system typically thought of as a centralized system. For example, a user device may function as a data communication content host providing transmission of data using hybrid network techniques according to the concepts herein.

Network links 111 and 112 used in providing data communication between centralized system 102 and user device 106 of the illustrated embodiment preferably implement different communication techniques. For example, network link 111 may provide a bi-directional data communication link between centralized system 102 and user device 106, while network link 112 provides a uni-directional data communication link between the data communication devices. A hybrid network configuration of the illustrated embodiment of system 100 may, for example, utilize a broadcast communication technique with respect to network link 112 to deliver large amounts of data communication content to user device 106 and a uni-cast communication technique with respect to network link 111 to facilitate delivery to and utilization of the data communication content by user device 106. Such network links, implementing the different communication techniques, are used cooperatively to provide efficient delivery of data communication content according to embodiments herein. For example, network link 111 implementing bi-directional communications may be utilized for data communication content delivery, control signaling, etc. while network link 112 is correspondingly utilized for delivery of large amounts of data communication content.

Figure 1B:
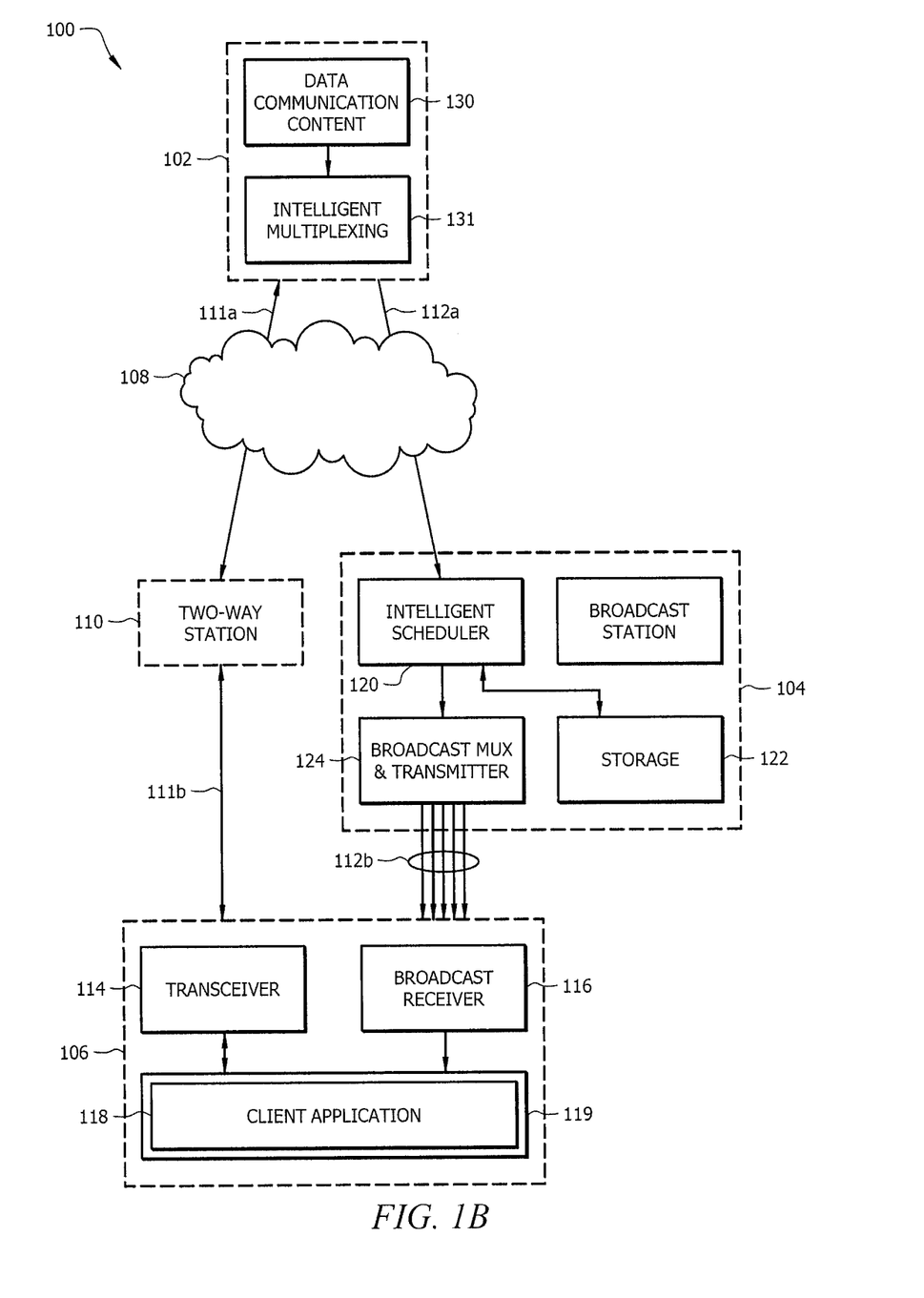

FIG. 1B shows additional detail with respect to system 100 of embodiments of the invention. In the depicted embodiment, system 100 includes centralized system 102 configured to communicate data communication content (e.g., digital data, documents, media, multimedia, etc.) to user device 106. Centralized system 102 may, for example, comprise a server (e.g., application server, web server, file server, etc.) or other node used in the delivery of data communication content to other communication devices. User device 106 may, for example, comprise various configurations of communication devices (e.g., mobile communication devices, such as smart phones, PDAs, tablet devices, portable PCs, etc., or other processor-based systems, such as servers, PCs, network appliances, etc.) operable to receive and/or utilize data communication content.

As shown in FIG. 1B, the hybrid network configuration of the illustrated embodiment provides at least two paths for data communication between centralized system 102 and user device 106. The first hybrid network path is shown as network link 111, which may provide a full-duplex or half-duplex, bi-directional data communication connection. The second hybrid network path is shown as network link 112, which may provide a uni-directional data communication connection. Network link 112 of the illustrated embodiment provides an additional avenue for communication between centralized system 102 and user device 106. Accordingly, centralized system 102 of the illustrated embodiment comprises intelligent multiplexing 131 coupled between data communication content 130 and network 180 operable to provide encoding and framing of data communication content as well as to direct data communication between the plurality of hybrid network paths in accordance with the concepts herein.

In the depicted embodiment, the first hybrid network path (i.e., network link 111) includes both communication channel 111a provided by network 108 between centralized system 102 and two-way station 110, and communication channel 111b provided between wireless network station 110 and user device 106. Similarly, the second hybrid network path (i.e., network link 112) of the illustrated embodiment includes both communication channel 112a provided by network 108 between centralized system 102 and broadcast station 104, and communication channel 112b provided between broadcast station 104 and user device 106.

It should be appreciated that network 108, providing communication channels utilized by the hybrid network configuration of the illustrated embodiment, may comprise various network infrastructure, such as that of a local area network (LAN), metropolitan area network (MAN), wide area network (WAN), wireless LAN (WLAN), intranet, extranet, Internet, cable transmission system, wireless network, cellular network, fiber optic network, public switched telephone network (PSTN), and/or the like. Accordingly, network 108 may include one or more wired or wireless paths between routing devices. Various of the foregoing infrastructure may be utilized in providing communication channels 111a and 112a facilitating the portion of network links 111 and 112 between centralized system 102 and two-way station 110 and broadcast station 104, respectively.

Although a same network is shown providing the portion of network link 111 coupling centralized system 102 and two-way station 110 (i.e., communication channel 111a) and the portion of network link 112 coupling centralized system 102 and broadcast station 104 (i.e., communication channel 112a), it should be appreciated that configurations different than that shown may be utilized according to embodiments of the invention. For example, a first network (e.g., the PSTN or a cellular network) may be utilized to provide a communication channel between centralized system 102 and two-way station 110 while a second network (e.g., the Internet or a WAN) may be utilized to provide a communication channel between centralized system 102 and broadcast station 104. Of course, no network need be disposed between the centralized system and other stations utilized by a hybrid network configuration of embodiments herein. For example, centralized system 102 may be co-located with, or integral with, one or more of two-way station 110 and broadcast station 104 according to embodiments.

Two-way station 110 of embodiments comprises a network node or other device for facilitating data communication content delivery between various communication devices. For example, two-way station 110 may comprise an access point, such as may provide data communication in accordance with the Institute of Electrical and Electronics Engineers (IEEE) 802.11 or 802.16 standards, a cellular base station, such as may provide data communication in accordance with the long term evolution (LTE), $3^{rd}$ generation mobile telecommunications (3G) or $4^{th}$ generation mobile telecommunications (4G) standards, and/or the like suitable for providing bi-directional links as described herein. Two-way station 110 of embodiments, however, need not provide wireless communications. For example, two-way station 110 may comprise a wireline communication interface, such as a router, a telecommunications interface, etc., suitable for providing bi-directional links as described herein.

Broadcast station 104 of embodiments comprises a broadcast node for blind transmission of signals to various devices. For example, broadcast station 104 may comprise a television broadcast station, such as may provide transmission of one or more television signal broadcast, a radio broadcast station, such as may provide transmission of one or more radio signal broadcast, and/or the like suitable for providing relatively broadband uni-directional links as described herein. Broadcast station 104 of embodiments, however, need not provide wireless communications. For example, broadcast station 104 may comprise a wireline communication interface, such as a broadband optical fiber interface or cable transmission system interface, suitable for providing relatively broadband uni-directional links as described herein.

Consistent with the foregoing, the communication channel providing that part of network link 111 coupling two-way station 110 and user device 106 (i.e., communication channel 111b) is different than the communication channel providing that part of network link 112 coupling broadcast station 104 and user device 106 (i.e., communication channel 112b). For example, communication channel 111b may comprise a data communication channel through which user device 106 may interact with centralized system 102 according to standard data networking or cellular communication protocols as may be utilized by data communication devices such as user device 106. However, communication channel 112b may comprise a broadcast service channel adapted to provide data communication content delivery to communication devices according to hybrid networking operation herein.

Accordingly, broadcast station 104 is preferably adapted to facilitate hybrid delivery of data communication content according to embodiments of the invention. In particular, broadcast station 104 of the illustrated embodiment comprises scheduler module 120, storage device 122, broadcast multiplexer ("mux"), and transmitter module 124. Broadcast station 104 may receive data communication content data from centralized system 102 and store it in data storage device 122 until scheduler 120 determines that the data communication content should be broadcast over communication channel 112b by broadcast mux and transmitter module 124.

Scheduler 120 may maintain a schedule for broadcasting the data communication content. According to embodiments, scheduler 120 may incorporate manual scheduling elements and/or dynamic scheduling elements. Manual scheduling may be programmed by a user of system 100. By way of illustration, consider an embodiment where the user device 106 is configured to run a sporting media application, wherein data communication content of which is to be delivered by hybrid delivery techniques herein. An operator of centralized system 102 may contract with a broadcast service provider to provide a specified bandwidth, at a specified time, for a specified duration so that a football game may be broadcast to one or more client devices 106. In such an embodiment, scheduler 120 may reserve bandwidth at the specified time for broadcasting the football game. Dynamic schedule elements may include, for example, delivery of data communication content on demand. Accordingly, operation of centralized system 102 to deliver content to user device 106 on demand may interact with scheduler 120 to update a broadcast schedule thereof to accommodate transmission of the data communication content as demanded by the user device. Scheduler 120 may communicate a schedule of broadcast times for various data communication content to the communication devices (e.g., centralized system 102 and/or user devices 106) to facilitate the coordinated communication of data communication content.

The broadcast mux and transmitter 124 may split data communication content into multiple data streams for simultaneous transmission over multiple data channels, particularly where the data communication content is large. For example, mux and transmitter 124 may divide a data file for parallel transmission using frequency division multiplexing ("FDM"), time division multiplexing ("TDM"), and/or other multiplexing techniques. In addition, multiple sets of data may be combined and broadcast on the same broadcast channel to make more efficient use of the broadcast bandwidth.

In addition to, or in combination with, scheduler 120, storage device 122, and mux and transmitter 124, broadcast station 104 may include additional components which are not shown, but which one of ordinary skill may recognize as suitable for use with the embodiments described. For example, broadcast station 104 may include a processor. The processor may implement all or a portion of scheduler module 120. Storage device 122 may be either a non-volatile storage device or a volatile storage device. For example, storage device 122 may include a flash memory, a random access memory ("RAM"), a hard disk, or the like. In one embodiment, storage device 122 may store code, instructions, and/or other data which may be called and executed by the processor. For example, scheduler 120 may be a software defined module. The code for scheduler 120 may be stored on storage device 122 and executed by the processor. In addition, broadcast station 104 may include one or more transmitters associated with mux and transmitter 124.

User device 106 of the illustrated embodiment comprises transceiver 114 configured for bi-directional communication (e.g., with centralized system 102) via two-way station 110, preferably using one or more standard network protocols. User device 106 of the illustrated embodiment further comprises broadcast receiver 116 configured to receive one or more broadcast communication channels carrying data communication content broadcast by broadcast station 104. Broadcast receiver 116 may include a radio tuner configured according to one or more broadcast protocols, including Advanced Television Systems Committee ("ATSC"), China Multimedia Mobile Broadcasting ("CMMB"), and Digital Video Broadcasting ("DVB"). Additionally, user device 106 may also include processor 119 adapted to provide operation as described herein, such as through operation to load and execute client application 118.

Figure 2:
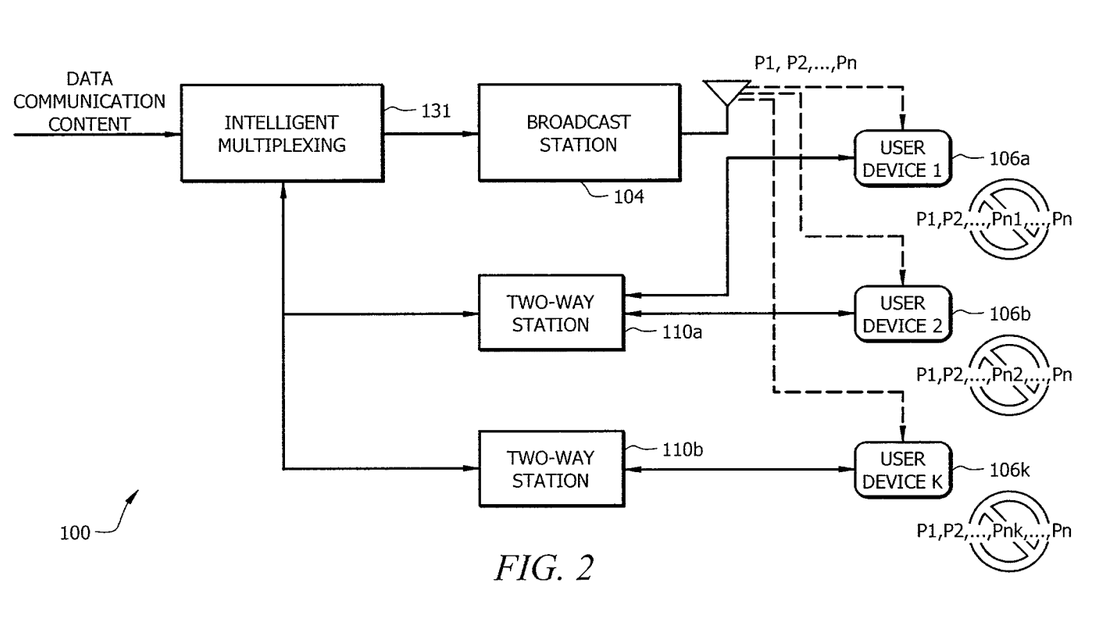
FIG. 2 shows operation of the system of FIGS. 1A and 1B for hybrid delivery of data communication content.

Having described exemplary hybrid network configurations of system 100, attention is now directed to FIG. 2 wherein operation of system 100 to provide hybrid delivery of data communication content is shown. It should be appreciated that system 100 is depicted in FIG. 2 to include a plurality of two-way stations (i.e., two-way stations 110a and 110b), either of which may correspond to two-way station 110 of FIG. 1B, and a plurality of user devices (i.e., user devices 106a-106k), any of which may correspond to user device 106 of FIGS. 1A and 1B, in order to better illustrate the operability and scalability of the system.

In operation according to the embodiment illustrated in FIG. 2, each of user devices 106a-106k has established a bi-directional network link with centralized system 102. Each such bi-directional network link may be utilized to provide uni-cast communication between the centralized system and the respective user devices, such as for data communication content delivery, data communication content delivery control, signaling, etc. Additionally, each of user devices 106a-106k has established a uni-directional network link with centralized system 102. Each such uni-directional network link may be utilized to provide broadcast communication between the centralized system and the respective user devices, such as for delivery of relatively large amounts of data communication content. For example, broadcast station 104 may operate to broadcast a stream of data packets, shown as data packets P1-Pn, formed from data communication content to be delivered to user devices 106a-106k.

It should be appreciated that packet losses are essentially inevitable in broadcasting, particularly in wireless broadcasting. Such packet losses are represented by the failed receipt of packet Pn1 by user device 106a, packet Pn2 by user device 106b, and packet Pnk by user device 106k, it being appreciated that the particular packets illustrated as lost are merely illustrative and any combination or distribution of packets may be lost among the user devices. Although certain packet losses may be recoverable by the user devices, such as through the use of data redundancy techniques (e.g., forward error correction, network coding, etc.), all such packet losses are generally not recoverable without unacceptably high data redundancy. Accordingly, embodiments of system 100 are adapted to implement one or more techniques for recovering data communication content losses associated with transmission via the uni-directional network link. Data content delivery loss recovery techniques implemented according to embodiments of the invention utilize network links (e.g., bi-directional network link) of the hybrid network other than or in addition to the uni-directional network links.

Figure 3A:
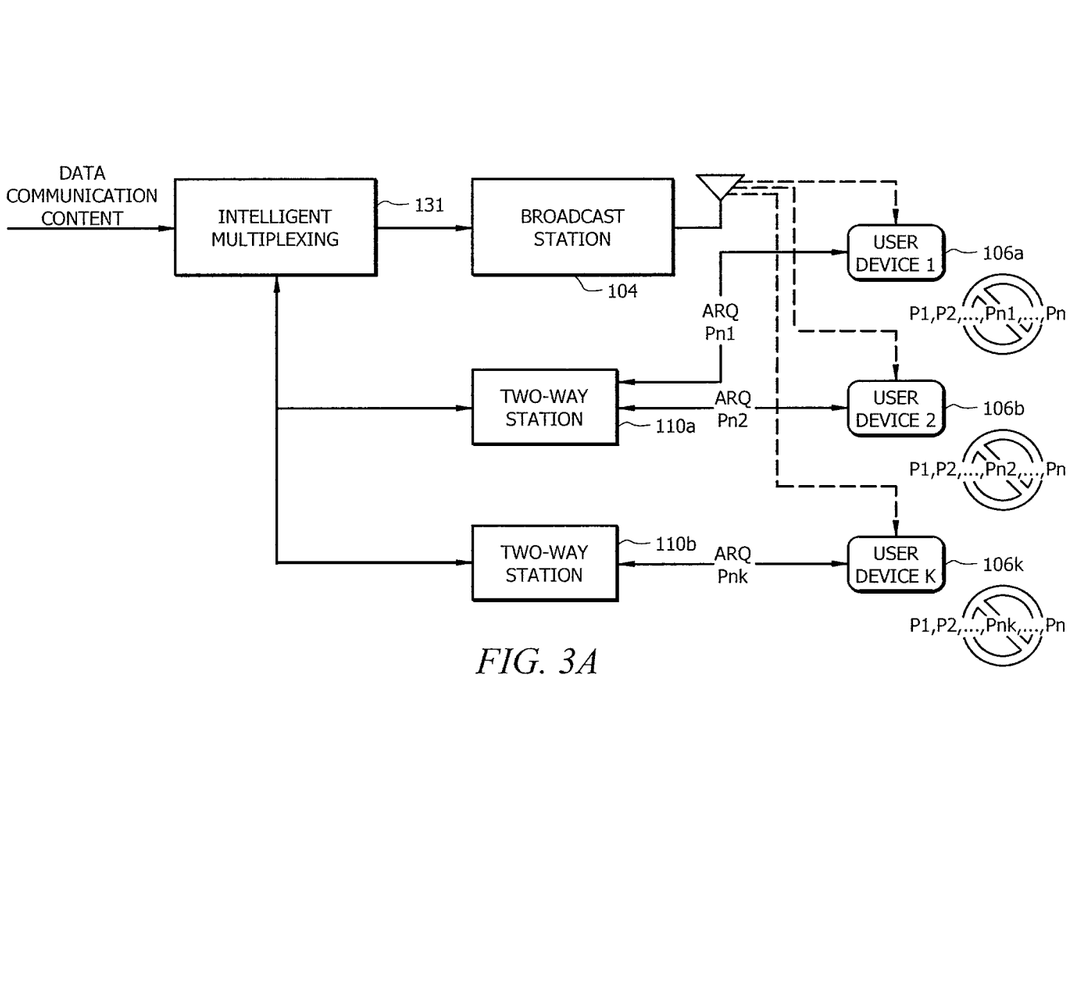
FIGS. 3A-3C show operation of the system of FIGS. 1A and 1B for data content delivery loss recovery using various techniques.

FIG. 3A shows an embodiment of system 100 implementing a hybrid repeat technique for data content delivery content loss recovery. For example, each user device having experienced packet losses may provide an automatic repeat request (ARQ) via the bi-directional network link of the hybrid network for retransmission of lost or otherwise unusable data packets. User device 106a may provide an ARQ requesting that packet $Pn_1$ be retransmitted, user device 106b may provide an ARQ requesting that packet $Pn_2$ be retransmitted, and user device 106k may provide an ARQ requesting that packet $Pn_k$ be retransmitted. The appropriate data packets may thus be retransmitted to the requesting data communication device, such as via the uni-directional network link using uni-cast communication techniques. For example, intelligent multiplexing 131 may receive the ARQs, obtain the appropriate data communication content from data communication content 130, and encode and frame the appropriate data communication content for uni-cast transmission to the respective user device. Accordingly, although the data communication content may have initially been transmitted using broadcasting techniques, via a uni-directional network link, retransmission of lost packets may be provided using uni-casting techniques, via a bi-directional network link in the embodiment illustrated in FIG. 3A.

Figure 3B:
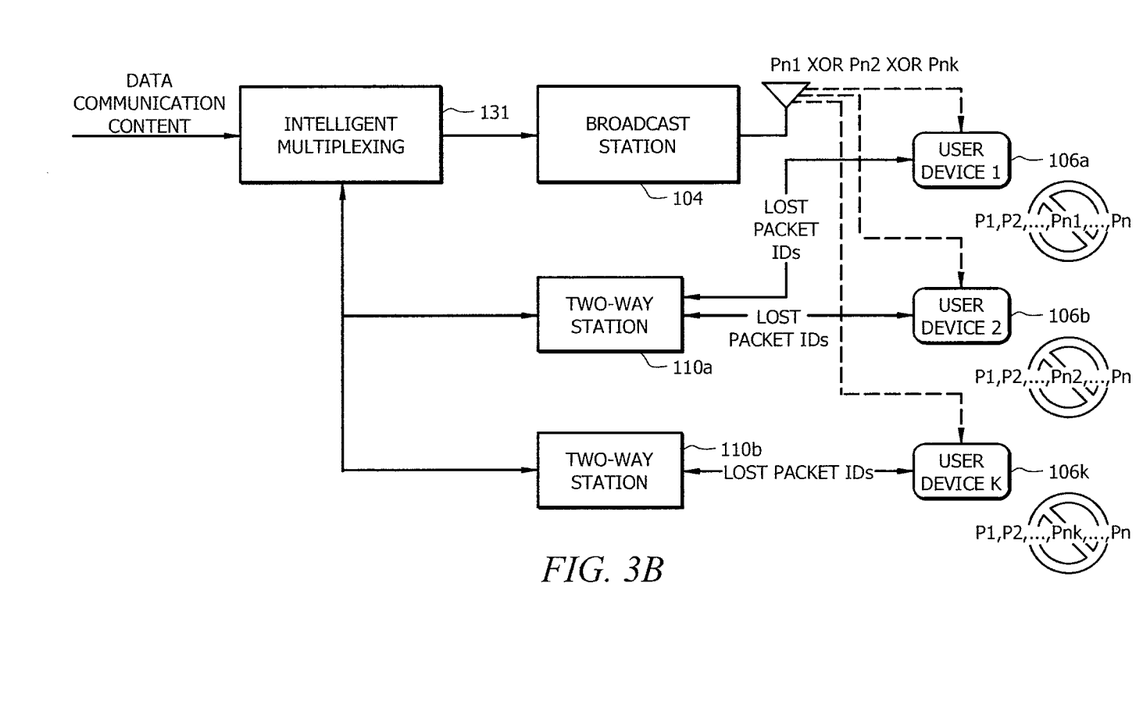

FIG. 3B shows an embodiment of system 100 implementing a hybrid retransmission technique for data content loss recovery. For example, each user device having experienced packet losses may provide lost packet identification, via a bi-directional network link of the hybrid network, for retransmission of lost or otherwise unusable data packets via the uni-directional network link. User device 106a may provide a message identifying packet $Pn_1$ as lost, user device 106b may provide a message identifying packet $Pn_2$ as lost, and user device 106k may provide a message identifying packet $Pn_k$ as lost. The appropriate data packets for each such data communication device may be collected for combined retransmission, such as using network coding techniques for retransmission via the uni-directional network link. For example, intelligent multiplexing 131 may receive the lost packet messages, obtain the appropriate data communication content from data communication content 130, and encode and frame the appropriate data communication content for broadcast transmission to the user devices. The packets indicated by one or more user device as having been lost may be collected, for example, until enough packets are available to provide a complete (e.g., full frame) or suitably robust (e.g., network coded) data packet, until a time threshold is met (e.g., maximum delay threshold to force retransmission where enough lost packets to otherwise trigger rebroadcast are not reported), periodically (e.g., using a regularly scheduled rebroadcast packet period), and/or the like. In operation according to embodiments of the invention, the rebroadcast packets are transmitted using redundancy, such as through using network coding techniques to combine the rebroadcast packets for transmission (e.g., as represented by the exclusive OR combining shown in FIG. 3B). Accordingly, a plurality of data packets to be rebroadcast, whether associated with the losses of the same or different user devices, may be utilized to provide efficient, robust rebroadcasting of the data communication content in the embodiment illustrated in FIG. 3B.

Figure 3C:
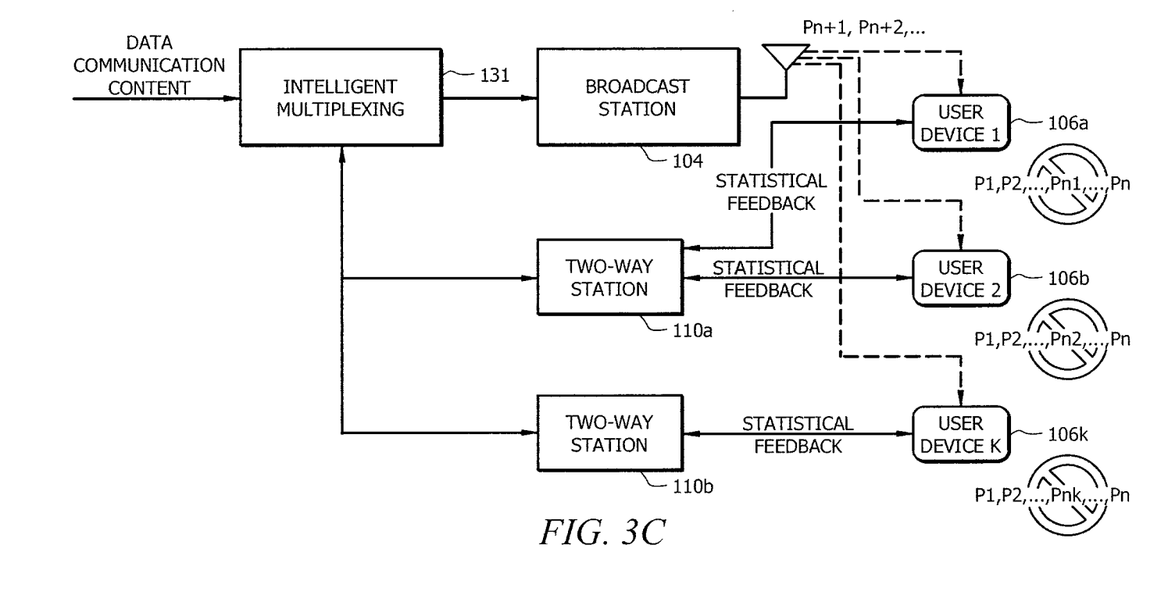

FIG. 3C shows an embodiment of system 100 implementing a hybrid statistical feedback technique for data content delivery loss recovery. For example, user devices receiving data communication content delivery via the uni-directional network link (e.g., each user device, a subset of the user devices, such as those experiencing data packet loss, etc.) provide feedback via the bi-directional network link of statistical information regarding their receipt of broadcast data packets. For example, each of user devices 106a-106k may analyze their reception of the broadcast data packets and determine statistical information with respect thereto, such as bit error rate, dropped packet count, etc. This statistical information may be utilized by centralized system 102 for optimizing redundancy of data communication content transmitted in the uni-directional network link, thereby providing dynamically adjusted data transmission redundancy based on feedback from the user devices.

In operation of a hybrid statistical feedback technique according to embodiments of the invention, the centralized system need not individually know the individual packet losses for the user devices, but rather determines statistically whether the broadcast data communication content is being received satisfactorily or unsatisfactorily. For example, if a statistically significant number of reports indicating very low levels of data packet losses (e.g., data packet losses less than 5% or, said another way, data packet reception greater than 95%) are received, logic of centralized system 102 may control intelligent multiplexing 131 to reduce the redundancy (e.g., reduce the number of times a packet is automatically retransmitted, reduce a level of forward error correction used, reduce packet redundancy in network coding, etc.) of the subsequently transmitted broadcast data (e.g., packets Pn+1, Pn+2, etc.) and thereby provide higher data throughput. Alternatively, if a statistically significant number of reports indicating unacceptably high levels of data packet losses (e.g., data packet losses greater than 5% or, said another way, data packet reception less than 95%) are received, logic of centralized system 102 may control intelligent multiplexing 131 to increase the redundancy (e.g., increase the number of times a packet is automatically retransmitted, increase a level of forward error correction used, increase packet redundancy in network coding, etc.) of the subsequently transmitted broadcast data (e.g., packets Pn+1, Pn+2, etc.) and thereby minimize data content delivery losses.

It should be appreciated that the lost data packets may not need to be retransmitted in order to provide for their recovery in operation of data content delivery loss recovery techniques utilized according to embodiments of the invention. For example, in the foregoing hybrid statistical feedback technique, wherein user devices experiencing data packet loss report loss statistics and the data content transmission system operates to adjust data redundancy in response, the subsequently received data packets may be utilized in recovering the data packets previously reported as lost. In one exemplary embodiment, network coding may be utilized in providing transmit redundancy with respect to the data communication content. Accordingly, the network coding redundancy of data packets subsequently transmitted with a higher level of redundancy, in response to user device reported statistics, may be utilized to recover the previously transmitted data packets according to embodiments here. Of course, one or more technique for the retransmission of lost data packets may be implemented in association with techniques such as the aforementioned hybrid statistical feedback technique, if desired.

Embodiments of a hybrid network configuration implement a combination of data content delivery loss recovery techniques. For example, system 100 of embodiments herein may operate to implement a combination of any or all of the aforementioned hybrid repeat, hybrid retransmission, and hybrid statistical feedback techniques. A particular one or more such data content delivery loss recovery technique may be selected to optimize network efficiency, to minimize data content delivery losses, to minimize data recovery delays, to meet service objectives (e.g., quality of service), etc. For example, a combined loss recovery technique may be implemented by system 100 wherein a hybrid statistical technique is utilized to optimize the use of broadcast channel bandwidth while a hybrid repeat technique is utilized to minimize data recovery delays. Additionally or alternatively, the combined use of loss recovery techniques by system 100 may provide for the selection of a particular loss recovery technique for use with respect to any particular data communication content transmission stream, whereby different loss recovery techniques may be implemented simultaneously but with respect to separate data communication content transmission streams. For example, particular attributes of the particular data communication content (e.g., the type of content, the content's tolerance to loss, etc.), its use by the user devices (e.g., real-time streaming consumption, storage for later use, etc.), the particular user devices themselves (e.g., decoder capabilities, storage capacity, processor capability, loss recovery techniques supported, etc.), the communication environment (e.g., noise levels on one or more transmission channel, available bandwidth in one or more channel, etc.), and/or the like may be utilized to determine one or more loss recovery technique to be implemented with respect to any or all data communication content streams transmitted using a hybrid network configuration of embodiments herein. In operation according to embodiments of a hybrid network configuration herein, the data communication content delivery is classified into different categories, whereby one or more particular data recovery technique is associated with each data communication content delivery category for use in achieving optimization of the network.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
    establishing bi-directional network links with a plurality of user devices;
    establishing uni-directional network links with the plurality of user devices;
    transmitting data communication content to the plurality of user devices at least in part through the uni-directional network links;
    receiving, through the bi-directional network links, information regarding the receipt of the data communication content transmitted to the plurality of user devices;
    implementing a data content delivery loss recovery technique for the data communication content transmitted through the uni-directional network link based upon the information received through the bi-directional network link, wherein the data content delivery loss recovery technique includes:
    determining an aggregate level of data packet loss for the plurality of user devices based at least in part on the information regarding the receipt of the data communication content;
    in response to determining the aggregate level of data packet loss for the plurality of user devices, modifying a frequency of retransmission of data packets corresponding to the data communication content based on the aggregate level of data packet loss;
    retransmitting one or more of the data packets corresponding to the data communication content based on the modified frequency of retransmission;
    transmitting second data communication content to at least one user device of the plurality of user devices via a respective one of the bi-directional network links and the uni-directional network links, wherein the data communication content is associated with a first data stream, and wherein the second data communication content is associated with a second data stream that is distinct from the first data stream;
    receiving information regarding the receipt of the second data communication content from the at least one user device; and
    implementing a second data content delivery loss recovery technique for the second data communication content transmitted based upon the information received from the at least one user device regarding the receipt of the second data communication content, wherein the data content delivery loss recovery technique is distinct from the second data content delivery loss recovery technique, and wherein the second data content delivery loss recovery technique is implemented concurrently with the data content delivery loss recovery technique.

2. The method of claim 1, wherein the uni-directional network link comprises a broadcast communication channel, and wherein the bi-directional network link comprises a data network communication channel.

3. The method of claim 2, wherein the broadcast communication channel comprises a television broadcast channel.

4. The method of claim 2, wherein the broadcast communication channel comprises a radio broadcast channel.

5. The method of claim 2, wherein the data network communication channel comprises a wireless local area network channel.

6. The method of claim 2, wherein the data network communication channel comprises a cellular network data channel.

7. The method of claim 1, wherein particular information regarding the receipt of the data communication content received from a particular user device of the plurality of user devices indicates a bit error rate, a dropped packet count, or a combination thereof for the particular user device.

8. The method of claim 7, wherein the one or more data packets corresponding to the data communication content are retransmitted to the plurality of user devices via through the uni-directional network links.

9. The method of claim 8, wherein the data communication content transmitted through the bi-directional network link is uni-cast to the user device.

10. The method of claim 1, wherein, when the aggregate level of data packet loss for the plurality of user devices satisfies a threshold, modifying the frequency of retransmission of the data packets includes increasing a number of times that the data packets are retransmitted, increasing a level of forward error correction applied to the data packets, or a combination thereof.

11. The method of claim 10, wherein, when the aggregate level of data packet loss for the plurality of user devices does not satisfy the threshold, modifying the frequency of retransmission of the data packets includes decreasing the number of times that the data packets are retransmitted, decreasing the level of forward error correction applied to the data packets, or a combination thereof.

12. The method of claim 10, wherein retransmitting the one or more data packets to the plurality of user devices-through the uni-directional network links includes rebroadcasting the one or more data packets with additional data packets via the uni-directional network links, wherein the additional data packets correspond to additional data communication content.

13. The method of claim 12, wherein the one or more data packets and the additional data packets are combined in the rebroadcast.

14. The method of claim 13, further comprising: using a network coding technique to combine the data communication content identified as lost by the plurality of user devices in the rebroadcast.

15. The method of claim 1, wherein particular information regarding the receipt of the data communication content received from a particular user device of the plurality of user devices does not identify particular data packets that were not received by the particular user device.

16. The method of claim 1, further comprising implementing a data content delivery loss recovery technique for the data communication content transmitted through the uni-directional network link based upon the information received through the bi-directional network links, wherein the data content delivery recovery technique includes retransmitting a particular data packet to a particular user device of the plurality of user devices via a particular bi-directional network link with the particular user device, wherein particular information received from the particular user device identifies the particular packet to be retransmitted via the particular bi-directional network link.

* * * * *